(12) United States Patent
Mamaclay

(10) Patent No.: US 7,953,316 B1
(45) Date of Patent: May 31, 2011

(54) PHOTOGRAPHER'S STEP AND GUARD

(76) Inventor: Bryan Mamaclay, Lihue, HI (US)

( * ) Notice: Subject to any disclaimer, the term of this patent is extended or adjusted under 35 U.S.C. 154(b) by 487 days.

(21) Appl. No.: 12/150,633

(22) Filed: Apr. 30, 2008

(51) Int. Cl.
 *G03B 15/00* (2006.01)
 *G03B 19/00* (2006.01)
 *G03B 13/00* (2006.01)
 *B65D 85/38* (2006.01)

(52) U.S. Cl. ............ 396/1; 396/429; 396/661; 224/908; 206/316.2

(58) Field of Classification Search .................. 396/423, 396/422, 429, 1, 661; 224/908; 206/316.2
See application file for complete search history.

(56) References Cited

U.S. PATENT DOCUMENTS

| | | | |
|---|---|---|---|
| 3,589,661 A * | 6/1971 | Harris | ............................ 248/432 |
| D355,828 S | 2/1995 | Dickinson et al. | |
| 5,641,034 A | 6/1997 | Calmeise et al. | |
| 5,645,511 A | 7/1997 | Le Roux et al. | |
| 5,697,669 A | 12/1997 | Yemini | |
| 5,882,097 A | 3/1999 | Kohagen et al. | |
| D411,351 S | 6/1999 | Kohagen et al. | |
| 6,886,660 B2 | 5/2005 | Sapatova | |
| 7,017,708 B1 | 3/2006 | Lynn | |

\* cited by examiner

*Primary Examiner* — Rochelle-Ann J Blackman
(74) *Attorney, Agent, or Firm* — Montgomery Patent and Design; Robert C. Montgomery (57) ABSTRACT

The invention as presently conceived discloses an apparatus that provides the dual function of protecting the contents of a camera bag as well as providing an elevated platform, specifically for a photographer. The apparatus resembles a conventional step-stool with a single step; however, it has two adjustable straps capable of securing a large camera bag containing multiple cameras and accessories to a bottom surface of the stool. The stool's rigid structure and design protects the bag and its contents from damage. The top of the stool surface is covered with a semi-cushioning, non-stick surface to prevent slippage. When functioning as only a stool, it allows a photographer to have additional height when shooting photographs, or serve as a small chair to sit upon when waiting for a photographic opportunity, or as a small work table to place camera parts.

10 Claims, 4 Drawing Sheets

PHOTOGRAPHER'S STEP AND GUARD

RELATED APPLICATIONS

The present invention was first described in and claims the benefit of Disclosure Document No. 609,167 filed Nov. 16, 2006, the entire disclosures of which are incorporated herein by reference.

FIELD OF THE INVENTION

The present invention describes a combination step multipurpose work platform and guard for equipment, particularly photographer's equipment such as a camera, a camera bag, a plurality of accessories commonly associated with photography, for use in a plurality of environments, including less-than-ideal locations.

BACKGROUND OF THE INVENTION

Employment of photographers is expected to increase about as fast as the average for all occupations through the foreseeable future. Demand for portrait photographers should increase as the population grows. Growth of internet versions of magazines, journals and newspapers will require increasing numbers of commercial photographers to provide digital images. The internet also should make it easier for freelancers to market directly to their customers, increasing opportunities for self-employment.

Professional and amateur photographers alike utilize a wide variety of cameras and accessories. It is not unusual for them to carry two (2) or more camera bodies, three (3) to four (4) lenses, flash units, extra film or digital media, accessories, batteries and the like at one time. Such a quantity of equipment is usually transported in an equipment bag which can be very expensive itself. As such, there is a strong desire to protect the bag and its costly contents, especially when shooting on location. Further, while shooting in the field there is a lack of amenities such as places to set or assemble cameras as well as places for the photographer to sit. Additionally, a photographer quite often requires an elevated position in order to get the perfect perspective for a shot.

Accordingly, there exists a need for a means by which camera bags and their contents can be protected from less than ideal field environments while also providing a multipurpose work platform. The development of the present invention fulfills this need.

U.S. Pat. No. 7,017,708 filed by Lynn discloses a recessed step. This patent does not appear to disclose an apparatus that possesses support members affixed to a base that also functions as a carrying apparatus for a camera bag or photographer's accessories.

U.S. Pat. No. 6,886,660 filed by Sapatova discloses a slip-resistant step stool and a method of manufacturing the same. This patent does not appear to disclose an apparatus that possesses adjustable support members affixed to a base and also does not appear to disclose a carrying apparatus for a camera bag or photographer's accessories.

U.S. Pat. No. D 411,351 filed by Kohagen et al. discloses a step tool box. This design patent does not appear to disclose an ornamental or industrial design similar to the invention herein described nor does this design patent appear to disclose an apparatus that possesses adjustable support members or a carrying apparatus for photography accessories.

U.S. Pat. No. 5,882,097 filed by Kohagen, et al. discloses a step tool box. This patent does not appear to disclose an apparatus that possesses adjustable support members affixed to a base and also does not appear to disclose a carrying apparatus for a camera bag or photographer's accessories.

U.S. Pat. No. 5,697,669 filed by Yemini discloses a combination stool and storage/tool box with rubber stopper. This patent does not appear to disclose an apparatus that possesses adjustable support members affixed to a base and also does not appear to disclose a carrying apparatus for a camera bag or photographer's accessories.

U.S. Pat. No. 5,645,511 filed by LeRoux and Edgerly discloses an exercise apparatus. This patent does not appear to disclose a support apparatus that possesses tubular support elements nor does it disclose an apparatus capable of conveniently transporting a camera bag or other photographic accessories.

U.S. Pat. No. 5,641,034 filed by Calmeise and O'Neal discloses a step stool having integral side storage compartments. This patent does not appear to disclose an apparatus that possesses adjustable support members affixed to a base and also does not appear to disclose a carrying apparatus for a camera bag or photographer's accessories.

U.S. Pat. No. D 355,828 filed by Dickinson and Gale discloses a single-step tool box. This patent does not appear to disclose an apparatus that possesses adjustable support members affixed to a base and also does not appear to disclose a carrying apparatus for a camera bag or photographer's accessories.

The prior art appears to disclose apparatuses that function as combination step stools and storage compartments. The prior art does not appear to disclose an apparatus that functions as a convenient means of transporting photography equipment and accessories while functioning as a step.

SUMMARY OF THE INVENTION

The photographer's step and guard provides the protection of a camera bag and functions as an elevated platform for a photographer.

The photographer's step and guard protects a camera case and also can elevate a photographer for more photogenic views.

The photographer's step and guard may be conveniently transported by hand or on a shoulder of the user.

The photographers step and guard comprises a base, four (4) support members, a pair of straps, two (2) eye loops, a rain-dust guard, and a mesh pocket.

The base comprises four (4) pivotally extending support members integrally attached thereto, comprising rectangular cross-sectional tubing, projecting diagonally outward at a distance for optimum stability. After utilization as a step, the support members are pivotally retracted to collapse for storage. The bottom of each support member comprises a protective rubberized barrier integrated thereon the bottom surface thereof to protect the floor from damage while utilizing the apparatus.

The rubberized coating on the upper surface provides optimum frictional environment thereby reducing an accidental slip.

The camera case may be secured to the photographer's step and guard via adjustable straps.

The base is designed for optimum stability and strength being sizable to accommodate the weight of the user while still being lightweight and relatively sized for portability.

The base and the support members are envisioned to be fabricated of a heavy-duty impact resistant plastic in an injection molding process.

The size of the photographer's step and guard varies to accept many different camera cases of various sizes and to accommodate a user's weight.

The photographer's step and guard would be made available in multiple colors.

The base member is of rectangular design. The base has an overall area sizable to accommodate the protection of the camera bag and to provide a substantial amount of footing for the user. The base comprises a rectangular cross-section with a reasonably dense thickness for optimum stability and strength capabilities. The upper portion of the base takes the form of a flat rectangular platform having an array of rubber coated rectangular fragments integrally attached thereto for providing greater traction.

The base member comprises four (4) hingedly attachable support members that comprise rectangular cross-sectional tubing. The support members project vertically downward or diagonally outward a designated distance and create an elevated platform with optimum stabilization. The support members are symmetrically attached to the base at four (4) corners. The support members are affixed to the axial plane of the base using attachment means such as, but not limited to welding, bolting, temporarily fixed or hinges. The support members possess an upper end and a lower end. The upper end is positioned on each corner of the base so that two (2) sides of said upper end are aligned with that of the base corner. The lower end comprises a hard rubberized surface with ridges for more stability. At each one of the four (4) corners resides hingedly telescopic support members, with rubberized feet residing on the bottom surface thereof. Each support member is pivotally connected to the four (4) corners and which, when not in use, lie horizontally outside of the recess to help protect the camera bag as well as act as a barrier. Once the support members are in the retracted orientation, the apparatus may be used as a seat as well as a protective carrying device. A base member section of the support member is envisioned to comprise one (1) or more cylindrical protrusions dimensioned to rotatably fit therein rotating apertures drilled in each of the four (4) corners of the base. The protrusions extend laterally outward therefrom the base member of the support members envisioned to be accommodated therein the rotating apertures of the base corners. Each protrusion is directed into the corresponding rotating aperture, thereby allowing each support member to pivot.

The support members are envisioned to be subdivided in three (3) telescopically extendable sections, a base member, a first extendable member, and a second extendable member. The support members may be designed in sections such that each section is slightly smaller than the previous to enable each section to be slidably received within one (1) another so that the overall height of said support members may be varied. The extendable members may have cross sectional areas in which decrease gradually such to come to the end that rests thereon the ground surface.

The base member, first extending member, and the second extending each have a contact surface having a plurality of equally spaced apertures. The apertures are drilled for selectively receiving a projection pin to secure the relative position of the base member and/or extending members. The apertures are selectively alignable with the projection pin, and fastened with said projection pin. The rubberized surface on the bottom of each support member thereof minimizes damage to surfaces and provides a frictional force between the support members and the ground surface. The rubberized bases are affixed to the bottoms of the support members using an adhesive or mechanical attachment means.

The rubber coated fragments may be of any size or geometric shape suitable for operably providing traction. The rubber coated fragments are affixed to the top platform utilizing either an adhesive or mechanical attachment.

The bottom of the base is envisioned to concave downwardly thereby forming a lip to provide a recess for removably receiving a detachable rain-dust guard and one (1) or more camera cases. A lip extends downward from the entire underside periphery to provide a boundary for the camera case once installed to the underside surface and to enable a user to manually grasp and carry the apparatus from place to place.

A strapping system is envisioned to be attached thereto the underside surface of the base. The flexibility of the straps and adjustment clips permit easy insertion and/or removal of the camera case and/or other articles that a user may require.

The straps are affixed thereto the underside surface of the base by use of an affixing means such as, but not limited to, sewing, adhering, or seaming. The straps are inserted through slots at the distal ends of a male clip portion and a female lock portion. The straps are elastic and comprise of one (1) or more pieces of durable and resilient material. The straps can be adjustably lengthened or shortened to a desired span utilizing adjustment clips installed thereon the straps. The straps are passed through adjustment clips and create loops. The length of the loops and the straps, along with the position of the adjustment clips may be adjusted along said straps to effectively increase and decrease the span. The straps securely permit the installation of the camera case of various sizes and shapes. Various fastener means may be provided for securing the straps to the base such as, but not limited to, hook-and-loop fasteners, buckles, or other locking mechanisms.

A clipping mechanism is envisioned to be used for the securing of the strap. The clipping mechanism comprises a male clip portion to be inserted within a female lock portion to interlock collectively The clipping mechanism is fabricated of materials such as, but not limited to, metals, plastic, or other durable substances. The male clip portion, comprises two (2) extendable prongs separated by a median rod and a means for receiving a strap at the distal end. The female lock portion comprises a main opening sized to operable receive the male clip portion with two (2) apertures on each side. Apertures are preferably adapted to engage the extendable prongs of the male clip portion to secure said male clip portion therein the female lock portion. The female lock portion further possesses a means for receiving a strap at the distal end. Once the male clip portion is engaged within the female lock portion, the extendable prongs may be compressed inwardly to disengage said male clip portion from the female lock portion, which permits separation of the respective lock portions.

Eye loops are affixed thereto the side surface of the base for allowing points of connection of a shoulder strap. The shoulder strap is attached symmetrically on two (2) sides of the outer surface of the base preferably one hundred eighty degrees (180°) apart thereof. The symmetric placement of the two (2) eye loops on opposite sides of the base acts to balance the apparatus for easy lifting and carrying. The shoulder strap is removably attached thereto the two (2) eye loops by means of clips of various design for the equalized weight distribution with a shoulder pad assembly constructed of a sewn cover to enclose a padding material therein for a cushioning comfort effect.

The shoulder strap comprises a shoulder pad that is wider than the straps for maximum weight distribution. The shoulder straps can be adjustably lengthened or shortened to a desired span utilizing installed adjustment clips. The straps are passed through the adjustment clips providing loops that may be adjusted along said straps to effectively increase and decrease the span of the shoulder straps.

The shoulder pad rests on top of the shoulder of a user and contours securely permitting the transporting of the apparatus. The contour edge provides additional protection and comfort to a user while carrying the apparatus using the shoulder strap. The straps provide an attachment means to the camera bag.

The rain-dust guard provides a protective cover to the apparatus, the camera equipment, the camera case, and the photographer from dust, mud, dirt, water, and other undesirable substances. The rain-dust guard also provides a protective platform when placing the camera bag or camera equipment upon a wet or dusty ground surface.

The rain-dust guard provides a detachable protective device useful during rainy or dusty weather conditions. The rain-dust guard provides a covering and ground covering surface to the photographer's stand and guard, the camera equipment, and the photographer. The rain-dust guard is stored within a mesh pocket located at an underside surface of the base. The rain-dust guard is made of a durable plastic water and dust proof material. An end opening is provided on the mesh pocket for easy extraction of said rain-dust guard from the secured orientation. The mesh pocket possesses fastening means for the end opening.

The photographer's stand and guard may be used by performing the following steps: placing the rain-dust guard within the mesh pocket through an end opening therein; placing one (1) or more camera cases therein the recess found on the underside of the base; wrapping the straps over said camera case to retain said camera case; inserting the male clip portion therein the female lock portion; adjusting the length of the securing straps via adjustment clips, as needed; securing the shoulder strap thereto each eye loop respectively, if needed; inserting one (1) arm therethrough the shoulder strap to transport the apparatus such that the shoulder pad is comfortably placed on the shoulder and the padded contoured edge portion of the base is facing a hip or side portion; adjusting the shoulder straps via adjustment clips, if needed; carrying the apparatus to the designated area; removing the shoulder strap therefrom the shoulder by reversing the previous two (2) steps; disengaging the male clip portion therefrom the female lock portion by compressing the extendable prongs inward; removing the camera case therefrom the recess; pivotally and rotatably extending the support members such that said support members extend diagonally outward; slidably extending the support members downward such that each support member is extended to its desired length; locking the vertical position of the support members via projection pin; and, stepping onto the upper surface of the base to an elevated level.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 photographer's step-guard
20 base
22 rubberized fragments
25 lip
27 recess
30 support member
31 rubberized feet
33 cylindrical protrusion
34 rotating aperture
35 base member
36 first extendable member
37 second extendable member
38 receiving aperture
39 projection pin
40 strap
42 adjustment clip
43 male clip portion
44 extendable prong
45 female lock portion
46 receiving aperture
50 eye loop
60 rain-dust guard
67 mesh pocket
70 camera bag
80 shoulder strap
82 clip
85 shoulder pad
86 contoured edge

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and that example configurations shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method that provides the protection of a camera bag 70 as well as function as an elevated platform, specifically for a photographer. The photographer's step guard (herein described as the "apparatus") 10 comprises a base 20, four (4) support members 30, a pair of straps 40, two (2) eye loops 50, a rain-dust guard 60, and a mesh pocket 67. The base 20 and the support members 30 are envisioned to be fabricated of a heavy-duty impact resistant plastic in an injection molding process that would typically require the design and utilization of custom molds. The size of the apparatus 10 is envisioned to vary to substantially accept a plurality of camera cases 70 of various sizes as well as to sustain photographers or other users of various weight. It is also envisioned that the apparatus 10 would be made available in multiple colors to match or complement the various camera bags 70 or taste of the user.

Figure 1:
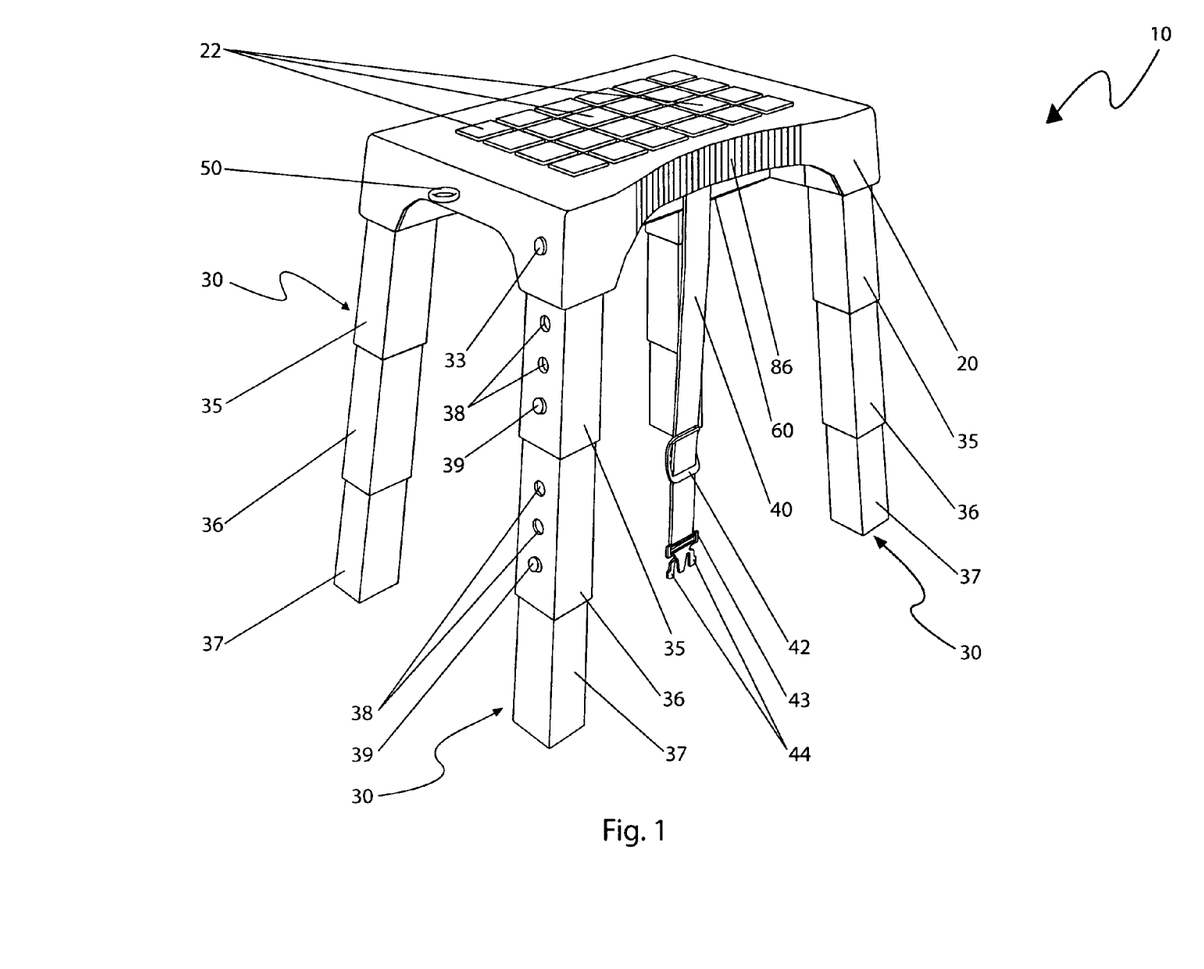
FIG. 1 is a perspective view of a photographer's step-guard 10, according to the preferred embodiment of the present invention.
Figure 2:
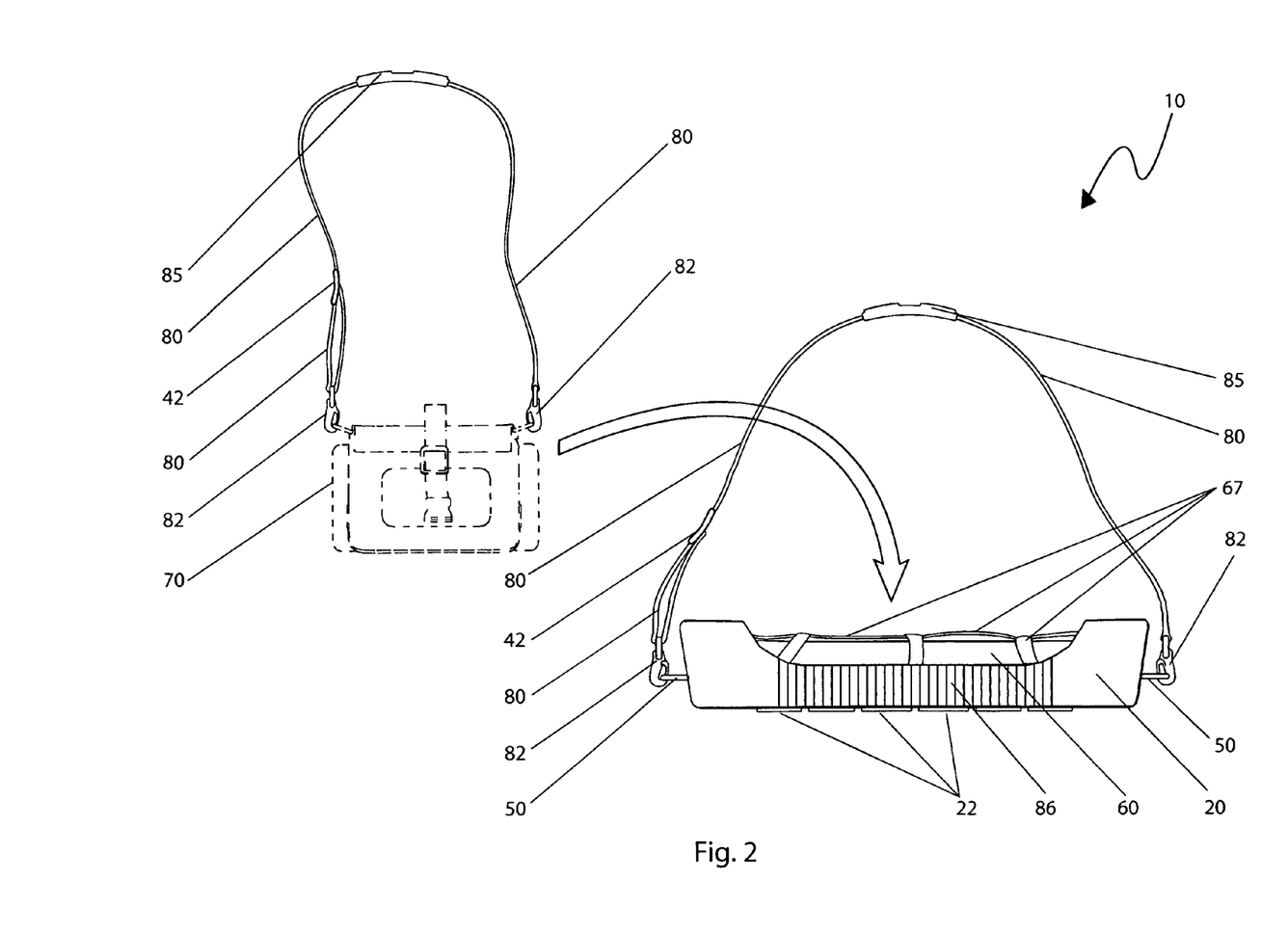
FIG. 2 is a side view of the photographer's step-guard 10 with a camera case 70 in the process of being removably inserted therein a recess 27, according to the preferred embodiment of the present invention.

Referring now to FIGS. 1 and 2, perspective and side views of the apparatus 10 are disclosed. A base member 20 of rectangular design is envisioned to protect the camera case 70 as well as support the user. The base 20 has an overall area sizable to accommodate the protection of the camera bag 70 as well as provide a substantial amount of footing for the user. The base 20 comprises a rectangular cross-section with a reasonably dense thickness for optimum stability and strength capabilities. The upper portion of the base 20 takes the form of a flat rectangular platform having an array of rubber coated rectangular fragments 22 integrally attached thereto for providing greater traction. The rubber coated fragments 22 may be of any size or shape suitable for operably providing traction such as, but not limited to, square, triangular, rectangular, circular, polygonal, or the like. The rubber coated fragments 22 are affixed to the top platform of the base 20 preferably, but not essentially, by adhesive, glue, or the like; however, it will be appreciated that said rubber coated fragments 22 may be mechanically attached thereto if so desired.

The bottom of the base 20 is envisioned to concave downwardly thereby forming a lip 25 to provide a recess 27 for removably receiving a detachable rain-dust guard 60 and one (1) or more camera cases 70. A lip 25 extends downward from the entire underside periphery so as to provide a boundary for the camera case 70 once installed thereto the underside surface as well as to enable a user to manually grasp and carry the apparatus 10 from place to place.

A strapping system 40 is envisioned to be attached thereto the underside surface of the base 20 suitable to secure the camera bag 70 and withstand the weight of said camera bag 70 and the contents residing therewithin. The apparatus 10 therefore provides a convenient means to transport and/or store a camera case 70 and/or other articles that a user requires in the performance of common photographic tasks. The straps 40 are affixed thereto the underside surface of the base 20 by means of sewing, adhering, seaming, or other affixing means and inserted therethrough slots at the distal ends of a male clip portion 43 and a female lock portion 45. The straps 40 are preferably, but not essentially, elastic, comprising of one (1) or more pieces of durable and resilient material. The straps 40 are also envisioned to be adjustably lengthened or shortened to a desired span utilizing adjustment clips 42 installed thereon the straps 40. The straps 40 are passed therethrough adjustment clips 42 providing loops. The length of the loops and the straps 40, along with the position of the adjustment clips 42 may be adjusted along said straps 40 to effectively increase and decrease the span. The straps 40 securely permit the installation of the camera case 70 of various sizes and shapes. A pair of straps 40 is illustrated here; however, it is envisioned that additional straps may be provided without deviating from the basic concept and as such should not be interpreted as a limiting factor of the present invention 10. Furthermore, it is also envisioned that various fastener means may be provided for securing the straps 40 to the base 20 such as, but not limited to, hook-and-loop fasteners, buckles, or other locking mechanisms without deviating from the basic concept and as such should not be interpreted as a limiting factor of the present invention 10.

A clipping mechanism is envisioned to be used for the securing of the strap 40. The clipping mechanism preferably comprises a male clip portion 43 to be inserted therewithin a female lock portion 45 receivable to interlock collectively. The clipping mechanism is envisioned to be fabricated of a metallic, plastic, or other durable substances. The male clip portion 43 generally comprises two (2) extendable prongs 44 separated by a median rod and a means for receiving a strap 40 at the distal end thereof. The female lock portion 45 generally comprises a main opening sized to operable receive the male clip portion 43 with two (2) apertures 46 on each side thereof. Said apertures 46 are preferably adapted to engage the extendable prongs 44 of the male clip portion 43 to secure said male clip portion 43 therein the female lock portion 45. The female lock portion 45 also comprises a means for receiving a strap 40 at the distal end thereof. Once the male clip portion 43 is engaged, therewithin the female lock portion 45, the extendable prongs 44 may be compressed inwardly to disengage said male clip portion 43 therefrom the female lock portion 45, thereby allowing the male clip 43 and female lock portions 45 to be separated.

Eye loops 50 are affixed thereto the side surface of the base 20 for allowing points of connection of a shoulder strap 80. The shoulder strap 80 is attached symmetrically on two (2) sides of the outer surface of the base 20 preferably one hundred eighty degrees (180°) apart thereof. The symmetric placement of the two (2) eye loops 50 on opposite sides of the base 20 acts to balance the apparatus 10 for easy lifting and carrying. The upward tension on the shoulder strap 80, exerted by the weight of the apparatus 10 and/or the camera case 70, stabilizes the apparatus 10 in a carrying orientation. The shoulder strap 80 is removably attached thereto the two (2) eye loops 50 by means of clips 82 of various design, as known in prior art, for the equalized weight distribution with a shoulder pad assembly 85 constructed of a sewn cover to enclose a padding material therein for a cushioning comfort effect. The shoulder strap 80 is envisioned to comprise a shoulder pad 85 that is wider than the straps 80 for maximum weight distribution. The shoulder straps 80 are also envisioned to be adjustably lengthened or shortened to a desired span utilizing adjustment clips 42 or the like installed thereon said straps 80. The straps 80 are passed therethrough the adjustment clips 42 providing loops. The length of the loops and the straps 80, along with the position of the adjustment clips 42 may be adjusted along said straps 40 to effectively increase and decrease the span of the shoulder straps 80. The shoulder pad 85 rests on top of the shoulder of a user and contours securely permitting the transporting of the apparatus 10. Also illustrated here is a padded and contoured edge 86 along an outside vertical surface of the base 20. The contour edge 86 provides additional protection and comfort to a user while carrying the apparatus 10 using the shoulder strap 80. Additionally, the straps 80 provide an attachment means in like manner thereto the camera bag 70, thereby providing increased versatility and utilization of said straps 80.

Figure 3:
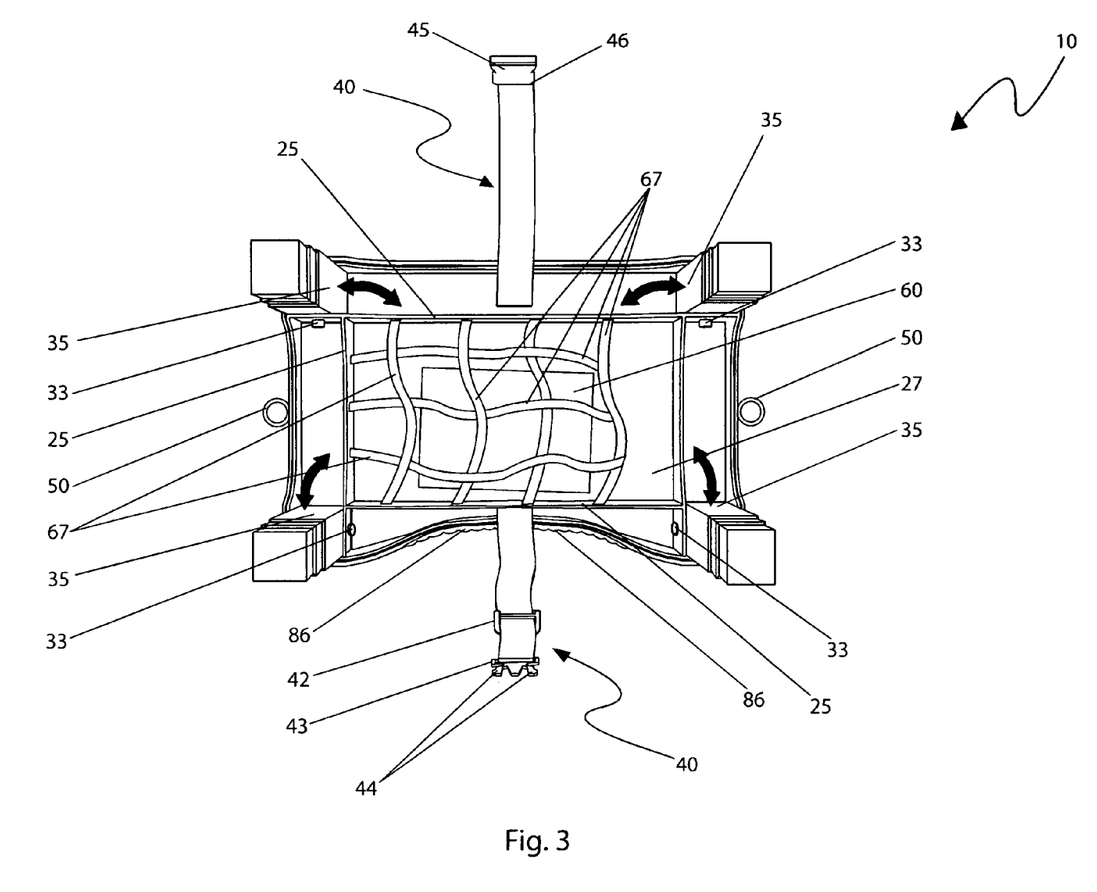
FIG. 3 is a bottom view of the photographer's step-guard 10 with a rain-dust guard 60, according to the preferred embodiment of the present invention; and, FIG. 4 is a close-up view of a support member 30 attachably removed therefrom the apparatus 10, according to the preferred embodiment of the present invention.

Referring now to FIG. 3, a bottom view of the apparatus 10 is disclosed according to the preferred embodiment of the present invention. A rain-dust guard 60 provides a detachable protective device being particularly useful during rainy or dusty weather conditions. The rain-dust guard 60 provides a covering and ground covering surface to the apparatus 10, the camera equipment, and the photographer. The rain-dust guard 60 is envisioned to be stored within a mesh pocket 67 affixed thereto a recess portion 27 located at an underside surface of the base 20. The rain-dust guard 60 is envisioned to be made using a durable plastic water and dust proof material. Whenever it is so desired to remove the rain-dust guard 60 from the recess 27, the mesh pocket 67 is envisioned to provide an end opening for easy extraction of said rain-dust guard 60 from the secured orientation. The mesh pocket 67 may provide other fastening means without leaving the scope of the invention such as, but not limited to, buttons, snaps, zippers, tabs, and other impermanent securing means.

Figure 4:
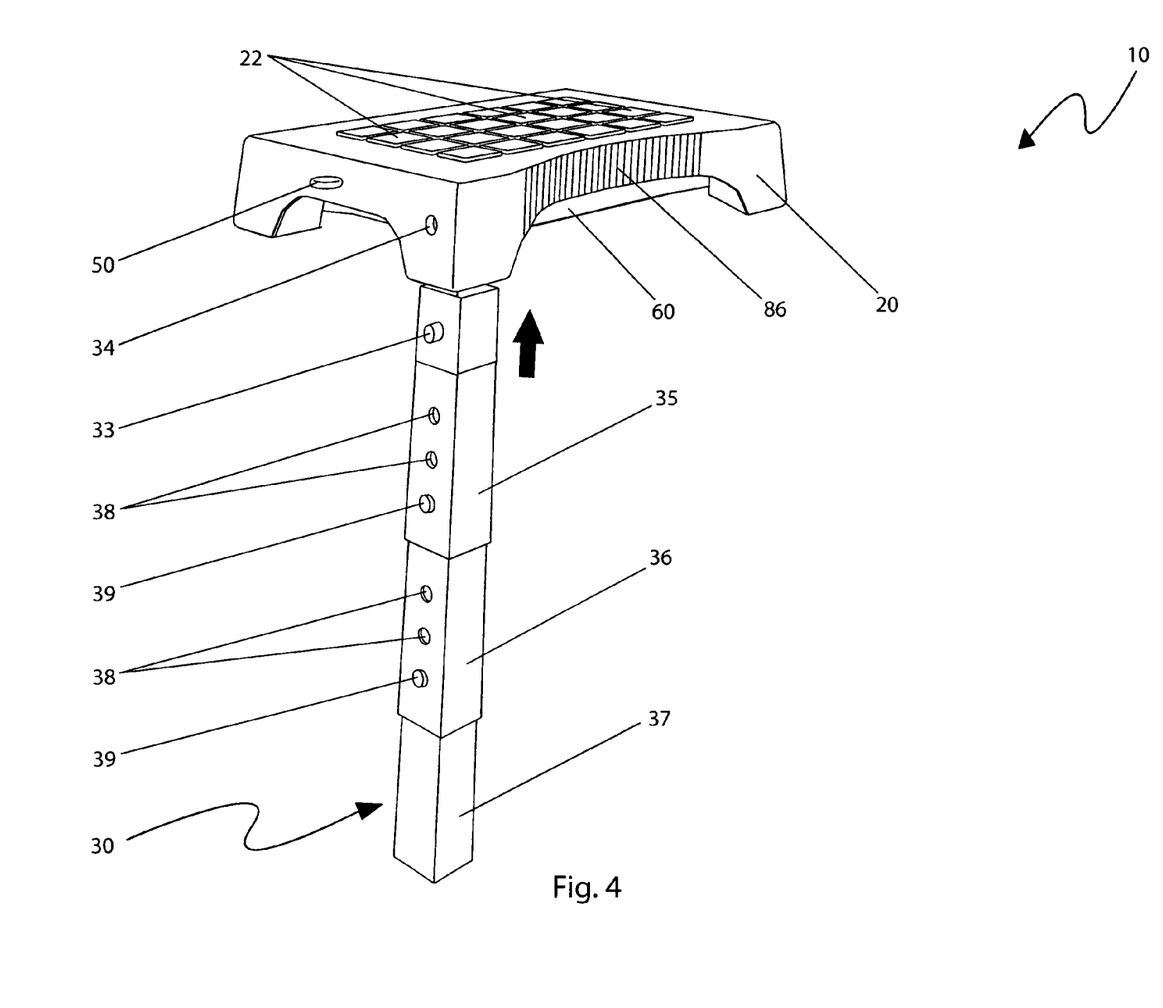

Referring now to FIG. 4, a close-up view of a support member 30 attachably removed therefrom the apparatus 10, is disclosed according to the preferred embodiment of the present invention. The base member 20 comprises four (4) hingedly attachable support members 30, envisioned to comprise rectangular cross-sectional tubing, that projects vertically downward or diagonally outward a designated distance to transform the apparatus 10 into an elevated platform that provides optimum stabilization. The support members 30 are symmetrically attached thereto the base 20 at four (4) corners projecting diagonally outward so as to make tipping less likely to occur thereby maximizing its effective stabilization once the support members 30 are in the extended orientation. The support members 30 can be welded, bolted, temporarily fixed or otherwise permanently fixed transversally thereto the axial plane of the base platform 20; however, it is preferred that the support members 30 to be hingedly affixed thereto the base 20. The support members 30 comprise an upper end and a lower end thereof such that the upper end is hingedly affixed thereto the base 20 thereof. The upper end is positioned thereon each corner of the base 20 so that two (2) sides of said upper end is preferably aligned with that of the base corner 20. The lower end comprises a hard rubberized surface 31 preferably, but not essentially, with ridges for more stability. At each one of the four (4) corners resides hingedly telescopic support members 30 with rubberized feet 31 residing on the bottom surface thereof. Each support member 30 is pivotally connected to the four (4) corners and which, when not in use, lie horizontally outside of the recess 27 to help protect the camera bag 70 as well as act as a barrier. Once the support members 30 are in the retracted orientation, the apparatus 10 may be used as a seat as well as a protective carrying device. The support members 30 are pivotally connected to the base 20 using any suitable mechanism. Preferably, the support members 30 are pivotally connected thereto the base 20 as depicted in FIG. 4. A base member section 35 of the support member 30 is envisioned to comprise one (1) or more cylindrical protrusions 33 dimensioned to rotatably fit therein rotating apertures 34 drilled therein each of the four (4) corners of the base 20. The protrusions 33 extend laterally outward therefrom the base member 20 of the support members 30 envisioned to be accommodated therein the rotating apertures 34 of the base corners 20. Each protrusion 33 is directed into the corresponding rotating aperture 34, thereby allowing each support member 30 to pivot, as desired.

The support members 30 are envisioned to be subdivided in three (3) telescopically extendable sections, a base member 35, a first extendable member 36, and a second extendable member 37. The support members 30 provide support for the base 20 and/or the weight of the user and help maintain the upright position of the apparatus 10. The support members 30 may be designed in sections such that each section is slightly smaller than the previous to enable each section to be slidably received therewithin one (1) another so that the overall height of said support members 30 may be varied. In this embodiment, the cross sectional area of the base member 35 is slightly larger than that of the cross sectional area of the first extendable member 36 and the cross sectional area of the first extendable member 36 is slightly larger than that of the second extendable member 37. The second extendable member 37 is permanently inserted therein one (1) end of the first extendable member 36 to extend outwardly at the distal end, and the first extendable member 36 is permanently inserted therein one (1) end of the base member 35. The sections are interconnected so that they form a substantially single unit that can be extended for a longer length or retracted for a shorter length. The first extending member 36 is sized to correspondingly be inserted therewithin the base member 35 such that the inside walls of the base member 35 uniformly abuts against the outside walls of the first extending member 36. The second extending member 37 is sized to correspondingly be inserted therewithin the first extending member 36 such that the inside walls of the first extending member 36 uniformly abuts against the outside walls of the second extending member 37. The extendable members, 35, 36, 37 may have cross sectional areas in which decrease gradually such to come to the end that rests thereon the ground surface.

The base member 35, first extending member 36, and the second extending 37 each have a contact surface having a plurality of apertures 38 equally spaced therethrough said surfaces. The apertures 38 are drilled therethrough for selectively receiving a projection pin 39 to secure the relative position of the base member 35 and/or extending members 36, 37. The apertures 38 are selectively alignable with the projection pin 39, and then fastenable with said projection pin 39.

The rubberize surface 31 on the bottom of each support member 30 thereof minimizes damage done thereto rugs, hardwood floors, ceramic floors, or other floors, as well as provide a frictional force therebetween the support members 30 and the ground surface. The bottom of the support members 30 are envisioned to be fabricated of a hard rubber 31 to protect the floor from scraping, scratching, rubbing, and the like against the desired floor surface while preventing sliding of the apparatus 10 especially when a user is standing, leaning, sitting, or otherwise providing weight thereon the apparatus 10. The rubberized bases 31 are affixed to the bottoms of the support members 30 preferably, but not essentially, by adhesive, glue, or the like; however, it will be appreciated that said rubberized bases 31 may be mechanically attached thereto if so desired.

The preferred embodiment of the present invention can be utilized by the common user in a simple and effortless manner with little or no training. After initial purchase or acquisition of the apparatus 10, it would be configured as indicated in FIGS. 1 through 4.

The method of utilizing the device may be achieved by performing the following steps: placing the rain-dust guard 60 within the mesh pocket 67 through an end opening therein; placing one (1) or more camera cases 70 therein the recess 27 found on the underside of the base 20; wrapping the straps 40 over said camera case 70 to retain said camera case 70; inserting the male clip portion 43 therein the female lock portion 45; adjusting the length of the securing straps 40 via adjustment clips 42, as needed; securing the shoulder strap 80 thereto each eye loop 50 respectively, if needed; inserting one (1) arm therethrough the shoulder strap 80 to transport the apparatus 10 such that the shoulder pad 85, is comfortably placed on the shoulder and the padded contoured edge portion 86 of the base 20 is facing a hip or side portion; adjusting the shoulder straps 80 via adjustment clips 42, if needed; carrying the apparatus 10 to the designated area; removing the shoulder strap 80 therefrom the shoulder by reversing the previous two (2) steps; disengaging the male clip portion 43 therefrom the female lock portion 45 by compressing the extendable prongs 44 inward; removing the camera case 70 therefrom the recess 27; pivotally and rotatably extending the support members 30 such that said support members 30 extend diagonally outward; slidably extending the support members 30 downward such that each support member 30 is extended to its desired length; locking the vertical position of the support members 30 via projection pin 39; and, stepping onto the upper surface of the base 20 to an elevated level.

The apparatus 10 comprises a means to protect a camera case 70 and elevate a photographer to an elevated level that may also be conveniently transported by hand or on a shoulder of the user. The apparatus 10 provides additional height when shooting photographs, or serve as a small chair to sit upon when waiting for a photographic opportunity, or as a small work table to place camera parts.

The removably insertion features of the camera case 70 therein the recess 27 of the underside of the base 20 minimizes the chance of misplacing the camera case 70 and/or the contents therein. Therefore, the apparatus 10 reduces the number of items that must be hand-carried and is also a convenient tool to elevate a photographer to a stance higher than others to provide a better outlook or photogenic views. The camera case 70 may be secured to the apparatus 10 via adjustable straps 40. The flexibility of the material of the straps 40 along with the adjustment clips 42 allow for easy insertion and/or removal of the camera case 70. In the retracted orientation, the apparatus 10 may be hand-carried or the shoulder strap 80 may be placed onto the shoulder. The rain-dust guard 60 is envisioned to provide a protective cover to the apparatus 10, the camera equipment, the camera case 70, and the photographer from dust, mud, dirt, water, and other undesirable substances. Additionally the rain-dust guard 60 is envisioned to provide a protective platform when placing the camera bag 70 or camera equipment upon a wet or dusty ground surface as well as providing an effective ground covering for a seated photographer.

The base 20 is of a design for optimum stability and strength having overall dimensions sizable to accommodate the weight of the apparatus 10 and the user while still being lightweight and relatively sized for portability. The rubberized coating 22 on the upper surface provides optimum frictional environment thereby reducing accidental slip.

The base 20 comprises four (4) pivotally extending support members 30 integrally attached thereto, comprising rectangular cross-sectional tubing, projecting diagonally outward at a distance for optimum stability. After utilization as an elevation tool, the support members 30 may be pivotally retracted to collapse for storage. The bottom of each support member 30 comprises a protective rubberized barrier 31 integrated thereon the bottom surface thereof to protect the floor from scraping, scratching, rubbing, and the like while utilizing the apparatus 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A multifunctional apparatus for protecting a photographer's existing camera while providing a step platform, said multifunctional apparatus comprising:
    a base;
    a plurality of support members pivotally connected to said base;
    a plurality of straps anchored to an underside of said base and being situated between said support members;
    a rain-dust guard removably positioned beneath said base for shielding the existing camera from undesirable debris; and,
    a mesh pocket anchored to said base and downwardly extending therebeneath for supporting the existing camera at an elevated position above a ground surface;
    wherein said base comprises:
        a flat upper portion having an array of fragments attached thereto for providing frictional traction; and,
        a bottom portion having a downwardly concaving configuration, said bottom portion further having a lip extending about an inner perimeter of said underside such that a recess is defined between said inner perimeter;
    wherein said rain-dust guard is detachably seated within said recess;
    wherein said lip extends downward from said bottom portion of said base and thereby provides a boundary for shielding the existing camera during transport;
    wherein each of said support members comprises:
        a base member;
        a first extendable member telescopically attached to said base member;
        a second extendable member telescopically attached to said first extendable member; and,
        means for selectively locking said base member and said first and second extendable members at alternate positions such that an overall longitudinal length of said support members is adapted along a linear travel path.

2. The multifunctional apparatus of claim 1, wherein said straps are affixed to said underside of said base and removably locked together at a location defined therebeneath, said straps having adjustable longitudinal lengths and being situated subjacent to said mesh pocket respectively.

3. The multifunctional apparatus of claim 1, further comprising:
    a plurality of eye loops attached directly to opposed sides of said base; and,
    a shoulder strap having opposed ends removably attached to said eyelets respectively such that said opposed ends of said shoulder strap are disposed 180° apart and thereby balance said base during transport.

4. The multifunctional apparatus of claim 1, wherein said base further comprises:
    a padded contoured edge disposed along an outside vertical surface of said base for providing comfort to a user while during transport.

5. The multifunctional apparatus of claim 1, wherein each of said support members are symmetrically attached to opposed corners of said base and project diagonally outward therefrom each of said support members being pivotally hinged to said base and independently adaptable between folded and unfolded positions respectively, said folded positions being defined along a plurality of horizontal pockets located outside of said recess such that each of said support members abut against said underside of said base when adapted to said folded position.

6. A multifunctional apparatus for protecting a photographer's existing camera while providing a step platform, said multifunctional apparatus comprising:
    a base;

a plurality of support members pivotally connected to said base;

a plurality of straps anchored to an underside of said base and being situated between said support members;

a rain-dust guard removably positioned beneath said base for shielding the existing camera from undesirable debris; and, a mesh pocket anchored to said base and downwardly extending therebeneath for supporting the existing camera at an elevated position above a ground surface;

wherein said base comprises:
  a flat upper portion having an array of fragments attached thereto for providing frictional traction; and,
  a bottom portion having a downwardly concaving configuration, said bottom portion further having a lip extending about an inner perimeter of said underside such that a recess is defined between said inner perimeter;

wherein said rain-dust guard is detachably seated within said recess;

wherein said lip extends downward from said bottom portion of said base and thereby provides a boundary for shielding the existing camera during transport;

wherein said straps are affixed to said underside of said base and removably locked together at a location defined therebeneath, said straps having adjustable longitudinal lengths and being situated subjacent to said mesh pocket respectively;

wherein each of said support members comprises:
  a base member;
  a first extendable member telescopically attached to said base member;
  a second extendable member telescopically attached to said first extendable member; and,
  means for selectively locking said base member and said first and second extendable members at alternate positions such that an overall longitudinal length of said support members is adapted along a linear travel path.

7. The multifunctional apparatus of claim 6, further comprising:
  a plurality of eye loops attached directly to opposed sides of said base; and,
  a shoulder strap having opposed ends removably attached to said eyelets respectively such that said opposed ends of said shoulder strap are disposed 180° apart and thereby balance said base during transport.

8. The multifunctional apparatus of claim 6, wherein said base further comprises:
  a padded contoured edge disposed along an outside vertical surface of said base for providing comfort to a user while during transport.

9. The multifunctional apparatus of claim 6, wherein each of said support members are symmetrically attached to opposed corners of said base and project diagonally outward therefrom each of said support members being pivotally hinged to said base and independently adaptable between folded and unfolded positions respectively, said folded positions being defined along a plurality of horizontal pockets located outside of said recess such that each of said support members abut against said underside of said base when adapted to said folded position.

10. A method for proving a combined step platform and camera carrier apparatus, said method comprising the steps of:
  providing a base, a plurality of support members, a plurality of straps, a rain-dust guard and a mesh pocket;
  placing said rain-dust guard within said mesh pocket;
  placing an existing camera within a recess located on an underside of said base;
  wrapping said straps about the existing camera;
  locking said straps to each other;
  adjusting a length of said straps;
  said method further comprising the steps of:
  providing and attaching a plurality of eye loops to said base;
  providing and securing a shoulder strap to each of said eye loops;
  inserting one user arm through said shoulder strap such that a shoulder pad section of said strap is placed on a user shoulder and a padded contoured edge portion of said base faces a hip portion of the user;
  transporting said apparatus to a desired location;
  removing said shoulder strap from the user shoulder;
  removing the existing camera from said recess;
  pivotally and rotatably extending said support members such that said support members extend diagonally outward from said base;
  slidably extending said support members downward to a desired length;
  locking said support members at a vertical position; and,
  stepping onto an upper surface of said base.

* * * * *